(12) United States Patent
Makowski et al.

(10) Patent No.: US 10,800,458 B2
(45) Date of Patent: Oct. 13, 2020

(54) ENERGY ABSORBING SEAL FOR A VEHICLE

(71) Applicant: Ford Global Technologies, LLC, Dearborn, MI (US)

(72) Inventors: Matthew B. Makowski, Northville, MI (US); Chelliah Madasamy, Canton, MI (US); Joseph David Hyde, Flint, MI (US); Deepak Patel, Canton, MI (US); Garam Jun, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 16/276,136

(22) Filed: Feb. 14, 2019

(65) Prior Publication Data
US 2020/0262482 A1 Aug. 20, 2020

(51) Int. Cl.
| | | |
|---|---|---|
| *B60J 7/00* | (2006.01) | |
| *B62D 21/15* | (2006.01) | |
| *B62D 25/08* | (2006.01) | |
| *B60J 10/86* | (2016.01) | |
| *B62D 25/12* | (2006.01) | |
| *B60J 10/24* | (2016.01) | |

(52) U.S. Cl.
CPC ............ *B62D 21/152* (2013.01); *B60J 10/86* (2016.02); *B62D 25/087* (2013.01); *B62D 25/12* (2013.01); *B60J 10/24* (2016.02)

(58) Field of Classification Search
CPC . B60R 2021/343; B60R 21/34; B60R 19/023; B60R 19/18; B62D 25/105; B62D 25/12; A41D 15/04; A45F 3/04; A45F 2003/003; A45F 4/12
See application file for complete search history.

(56) References Cited

U.S. PATENT DOCUMENTS

| | | | | |
|---|---|---|---|---|
| 5,533,779 A | * | 7/1996 | Epple | ................... B60H 3/0085 15/250.01 |
| 6,386,623 B1 | | 5/2002 | Ryan et al. | |
| 6,712,169 B2 | | 3/2004 | Ryan et al. | |
| 7,052,079 B2 | * | 5/2006 | Endo | ................... B62D 25/105 296/187.09 |

(Continued)

FOREIGN PATENT DOCUMENTS

| | | |
|---|---|---|
| DE | 10311220 A1 | 9/2004 |
| DE | 102011102634 A1 | 11/2012 |

(Continued)

*Primary Examiner* — Kiran B Patel
(74) *Attorney, Agent, or Firm* — Frank A. MacKenzie; Bejin Bieneman PLC

(57) ABSTRACT

A vehicle includes a storage compartment. The vehicle includes a hood above the storage compartment. The hood is movable relative to the storage compartment between an open position and a closed position. The vehicle includes a flange connected to one of the hood and the storage compartment and a ring-shaped energy absorber connected to the other of the hood and the storage compartment. The flange and the ring-shaped energy absorber both circumferentially enclose the storage compartment in the closed position. The vehicle includes a seal mounted to the ring-shaped energy absorber and positioned between the ring-shaped energy absorber and the flange in the closed position.

20 Claims, 5 Drawing Sheets

(56) References Cited

U.S. PATENT DOCUMENTS

| | | | |
|---|---|---|---|
| 7,143,856 B2 | 12/2006 | Takahashi et al. | |
| 7,287,614 B2* | 10/2007 | Chernoff | B62D 25/105 |
| | | | 180/69.2 |
| 7,488,031 B2* | 2/2009 | Ishitobi | B60R 21/34 |
| | | | 296/187.04 |
| 7,677,631 B1* | 3/2010 | Zischke | B60K 15/05 |
| | | | 180/69.24 |
| 8,118,352 B2 | 2/2012 | Rocheblave et al. | |
| 8,807,637 B2 | 8/2014 | Partsch et al. | |
| 8,827,358 B2 | 9/2014 | Rocheblave et al. | |
| 9,033,407 B2* | 5/2015 | Ikeda | B60R 21/34 |
| | | | 296/187.04 |
| 9,156,432 B2* | 10/2015 | Ferri | B62D 25/10 |
| 9,248,866 B2* | 2/2016 | Hammer | B62D 25/105 |
| 9,415,744 B1 | 8/2016 | Stojkovic | |
| 9,643,656 B1* | 5/2017 | Hall | B62D 25/12 |
| 9,783,236 B1* | 10/2017 | Rivera | B62D 29/04 |
| 9,897,287 B1* | 2/2018 | Cotton | B60Q 3/225 |
| 9,914,485 B2* | 3/2018 | Hammer | B62D 25/12 |
| 9,950,744 B2* | 4/2018 | Hammer | B62D 25/105 |
| 10,336,409 B1* | 7/2019 | Girard | B63B 34/10 |
| 2009/0026807 A1* | 1/2009 | Wang | B62D 25/105 |
| | | | 296/193.11 |
| 2010/0259033 A1* | 10/2010 | Okabe | B60R 21/0136 |
| | | | 280/734 |
| 2012/0187719 A1* | 7/2012 | Fujii | B62D 21/152 |
| | | | 296/187.09 |
| 2013/0153316 A1* | 6/2013 | Stuckey | H01M 10/625 |
| | | | 180/68.5 |
| 2015/0000994 A1* | 1/2015 | McLundie | B60R 21/38 |
| | | | 180/274 |
| 2015/0069786 A1* | 3/2015 | Benson | B62D 25/105 |
| | | | 296/187.09 |
| 2015/0291123 A1* | 10/2015 | Yoshida | B62D 25/105 |
| | | | 296/187.04 |
| 2017/0232926 A1 | 8/2017 | Barbat et al. | |
| 2020/0031401 A1* | 1/2020 | Salter | B60Q 3/30 |

FOREIGN PATENT DOCUMENTS

| | | |
|---|---|---|
| EP | 1568578 B1 | 1/2009 |
| FR | 2899177 A1 | 10/2007 |
| JP | 2004168111 A | 6/2004 |

* cited by examiner

ENERGY ABSORBING SEAL FOR A VEHICLE

BACKGROUND

A vehicle may include a storage compartment in a front of the vehicle for storage of various articles, e.g., spare wheels, tools, personal effects, etc. The storage compartment is positioned between a front bumper and a passenger cabin of the vehicle. The storage compartment may be covered by a hood of the vehicle. The hood may keep the storage compartment free from debris, such as rain, snow, road debris, etc.

DETAILED DESCRIPTION

Figure 1:
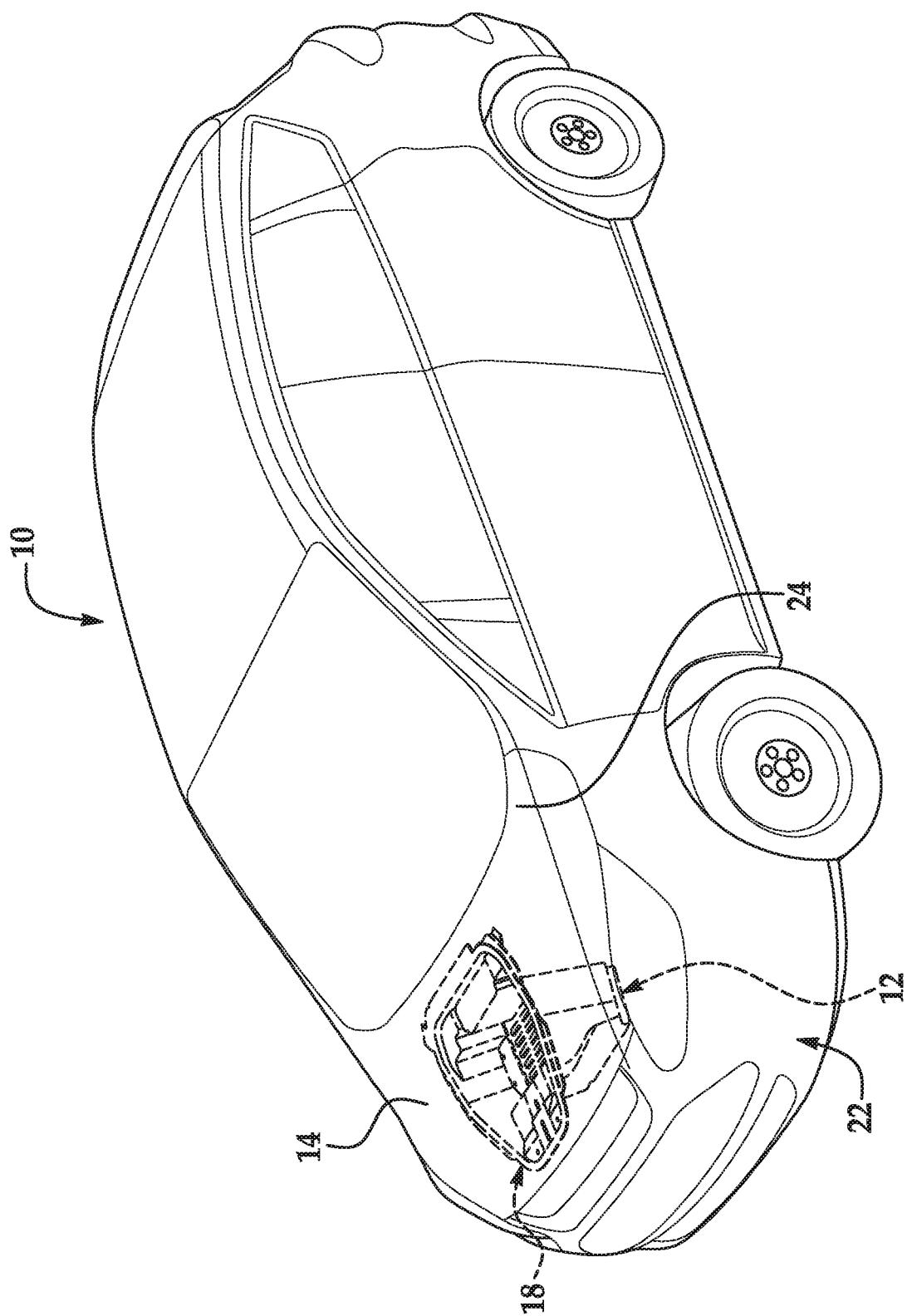
FIG. 1 is a perspective view of a vehicle including a storage compartment.

A vehicle includes a storage compartment and a hood above the storage compartment. The hood is movable relative to the storage compartment between an open position and a closed position. A flange is connected to one of the hood and the storage compartment and a ring-shaped energy absorber is connected to the other of the hood and the storage compartment. The flange and the ring-shaped energy absorber both circumferentially enclose the storage compartment in the closed position. A seal is mounted to the ring-shaped energy absorber and positioned between the ring-shaped energy absorber and the flange in the closed position.

The hood may include a hood outer and a hood inner positioned between the hood outer and the ring-shaped energy absorber. The ring-shaped energy absorber may be connected to the hood inner. The ring-shaped energy absorber may be compressible relative to the hood inner.

The ring-shaped energy absorber may be compressible relative to the flange.

The ring-shaped energy absorber may be hollow.

The ring-shaped energy absorber in a radial cross-section may have two feet spaced from each other and a cavity disposed therebetween. The two feet abut the hood. The ring-shaped energy absorber may include a base spaced from the hood and a leg extending from the base to each foot. The seal may be mounted to the base. The feet may be fixed to the hood. An insert may be in the cavity. An insert may be between the ring-shaped energy absorber and the one of the hood and the storage compartment. The cavity may face the hood.

The ring-shaped energy absorber in a radial cross-section may have a sinuous shape. The sinuous shape may have a peak spaced from the hood. The seal may be mounted to the peak. The sinuous shape may have two other peaks on opposites sides of the seal. The ring-shaped energy absorber may have feet extending from the sinuous shape in opposite directions with the feet abutting the hood.

A fastener may connect the ring-shaped energy absorber to the one of the hood and the storage compartment. The seal may be tubular and elongated around the flange.

With reference to the Figures, wherein like numerals designate like parts throughout the several views, a vehicle 10 includes a storage compartment 12. The vehicle 10 includes a hood 14 above the storage compartment 12. The hood 14 is movable relative to the storage compartment 12 between an open position and a closed position. The vehicle 10 includes a flange 16 connected to one of the hood 14 and the storage compartment 12 and a ring-shaped energy absorber 18 connected to the other of the hood 14 and the storage compartment 12. The flange 16 and the ring-shaped energy absorber 18 both circumferentially enclose the storage compartment 12 in the closed position. The vehicle 10 includes a seal 20 mounted to the ring-shaped energy absorber 18 and positioned between the ring-shaped energy absorber 18 and the flange 16 in the closed position.

The ring-shaped energy absorber 18 allows the hood 14 to deform during a pedestrian-to-vehicle impact. In addition, the ring-shaped energy absorber 18 absorbs energy from and reduces the impact velocity of the pedestrian during the pedestrian-to-vehicle impact. Since the ring-shaped energy absorber 18 is ring-shaped, the ring-shaped energy absorber 18 absorbs energy around the circumference of the flange 16 to provide a large coverage for pedestrian protection. In addition, the ring-shape allows for sealing around the entire circumference of the storage compartment 12, e.g., with the seal 20.

With reference to FIG. 1, the vehicle 10 may be a battery-electric vehicle (BEV). In other words, propulsion of the vehicle 10 may be powered electrically by battery cells. For example, wheels of the vehicle 10 may be powered by electric motors. In such an example, the battery cells may be below the passenger cabin of the vehicle 10 and the electric motors may be at the wheels of the vehicle 10. In another example, the vehicle 10 may have an internal combustion engine that is located in a middle or rear of the vehicle 10. The vehicle 10 may be of any type, e.g., a passenger automobile, taxi, ride-sharing automobile, etc.

Figure 2:
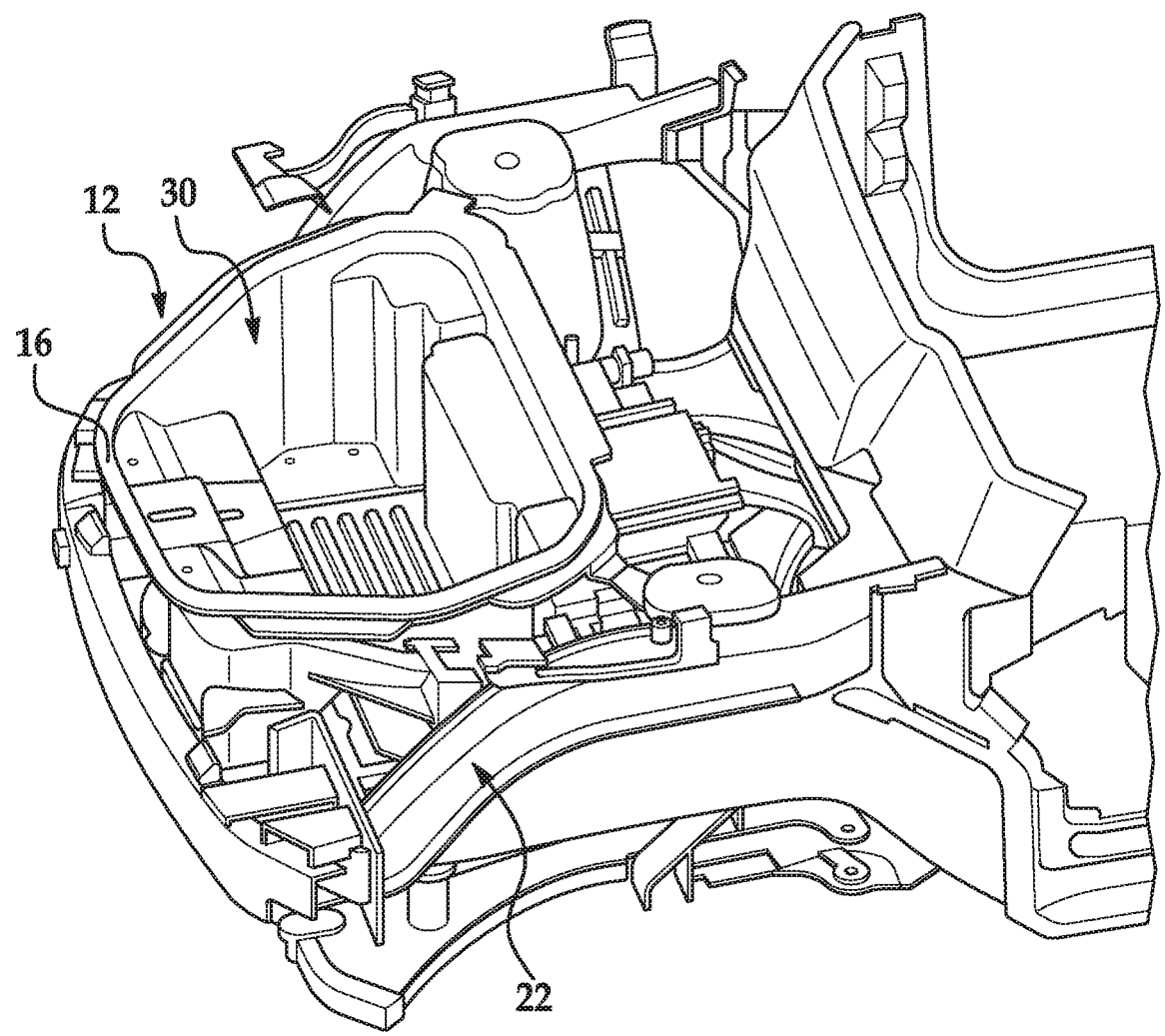
FIG. 2 is a perspective view of a portion of a vehicle including a body and a storage compartment supported by the body.
Figure 3:
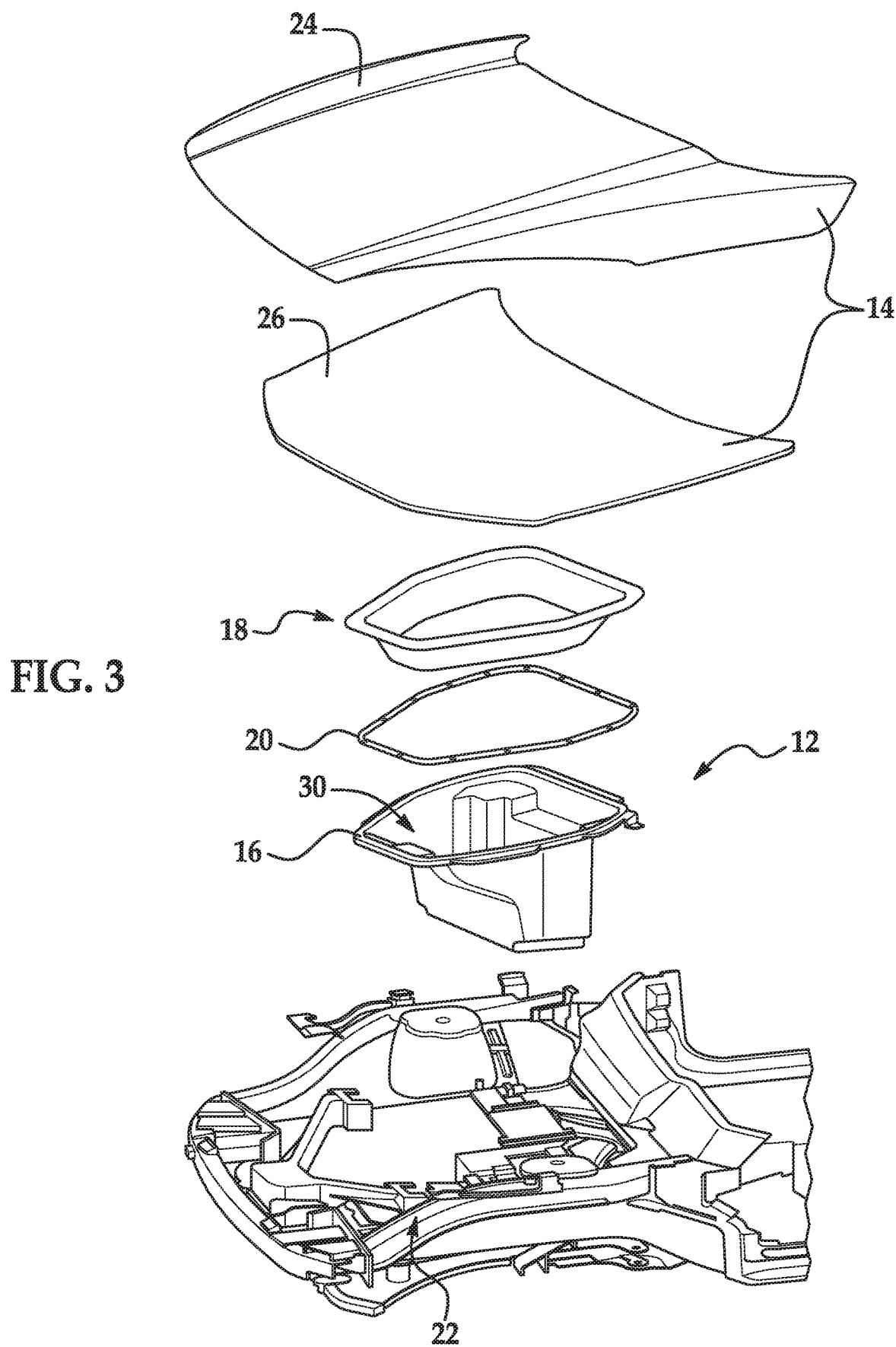
FIG. 3 is an exploded view of the body, a hood, the storage compartment, a ring-shaped energy absorber, and a seal.

With reference to FIGS. 1-3, the vehicle 10 includes a vehicle body 22. The vehicle body 22 may be of a unibody construction including both a frame and a body in unitary construction (including rockers, pillars, roof rails, etc.). As another example, the vehicle body 22 may have a body-on-frame construction (also referred to as a cab-on-frame construction) including a body-in-white and a frame that are separate components, i.e., are modular. Alternatively, the vehicle body 22 may have any suitable construction. The vehicle body 22 may be of any suitable material, for example, steel, aluminum, and/or fiber-reinforced plastic, etc.

The storage compartment 12 may be directly connected to components of the vehicle body 22. In one example, the storage compartment 12 may be directly connected to a shock tower mount, e.g., by fasteners and/or welding. In addition or in the alternative, the storage compartment 12 may be directly connected to rails, cross-members, etc., of the vehicle body 22. The storage compartment 12 may be positioned between a front bumper and the passenger cabin. For example, the storage compartment 12 may be positioned forward of the passenger cabin and rearward of the front bumper. The storage compartment 12 may carry cargo, such as a spare wheel, tools, personal effects, luggage, jack and lug wrench, an emergency kit, etc.

The hood 14 is positioned above the storage compartment 12 and is moveable relative to the storage compartment 12 between an open position (not shown) and a closed position (shown in FIG. 1). The hood 14 is positioned forward of a windshield and keeps the storage compartment 12 free from debris, such as rain, snow, road debris, etc. The hood 14 may also be referred to as a bonnet. The front bumper may be located below a front of the hood 14 and may absorb energy in a frontal collision for the vehicle 10.

The hood 14 includes a hood outer 24 and a hood inner 26. The hood outer 24 is disposed above the hood inner 26. As shown in the Figures, the hood outer 24 is exposed when the hood 14 is in the closed position. The hood outer 24 may present a class-A surface, e.g., a finished surface exposed to view and free of unaesthetic blemishes and defects. The hood outer 24 and the hood inner 26 may be of the same type of material. The hood outer 24 and/or the hood inner 26 may, for example, be plastic, such as sheet molding composite (SMC), carbon fiber reinforced plastic (CFRP), fiberglass, and/or other fiber reinforced plastic. As another example, the hood outer 24 and/or the hood inner 26 may be formed of metal, e.g., aluminum, steel, etc. The hood inner 26 may lack hood inner formations, holes, slots, and/or reinforcements to promote a simpler design.

The hood outer 24 is fixed relative to the hood inner 26, that is, the hood outer 24 and hood inner 26 move together as a unit between the open and closed position. The hood outer 24 may be directly or indirectly attached to the hood inner 26 by, for example, application of adhesive, plastic welding, metal welding, etc. Alternatively, the hood outer 24 and the hood inner 26 may have a hem flange 16 that connects the hood outer 24 to the hood inner 26.

The hood 14 may be attached to the vehicle body 22 at a hinge (not shown). The hinge may be fixed to the hood inner 26 and/or the hood outer 24. The hood outer 24 and the hood inner 26 move together as a unit about the hinge, e.g., to access the storage compartment 12. A latch (not shown) may fix the hood 14 in the closed position relative to the body of the vehicle 10.

The flange 16 is connected to one of the hood 14 and the storage compartment 12 and the ring-shaped energy absorber 18 is connected to the other of the hood 14 and the storage compartment 12. In the example shown in the Figures, the flange 16 is connected to the storage compartment 12 and the ring-shaped energy absorber 18 is connected to the hood 14. As an example, the flange 16 may be unitary with the storage compartment 12, i.e., a single, uniform piece of material with no seams, joints, fasteners, or adhesives holding it together. As another example, the flange 16 may be formed separation from the storage compartment 12 and subsequently affixed to the storage compartment 12.

Figure 6:
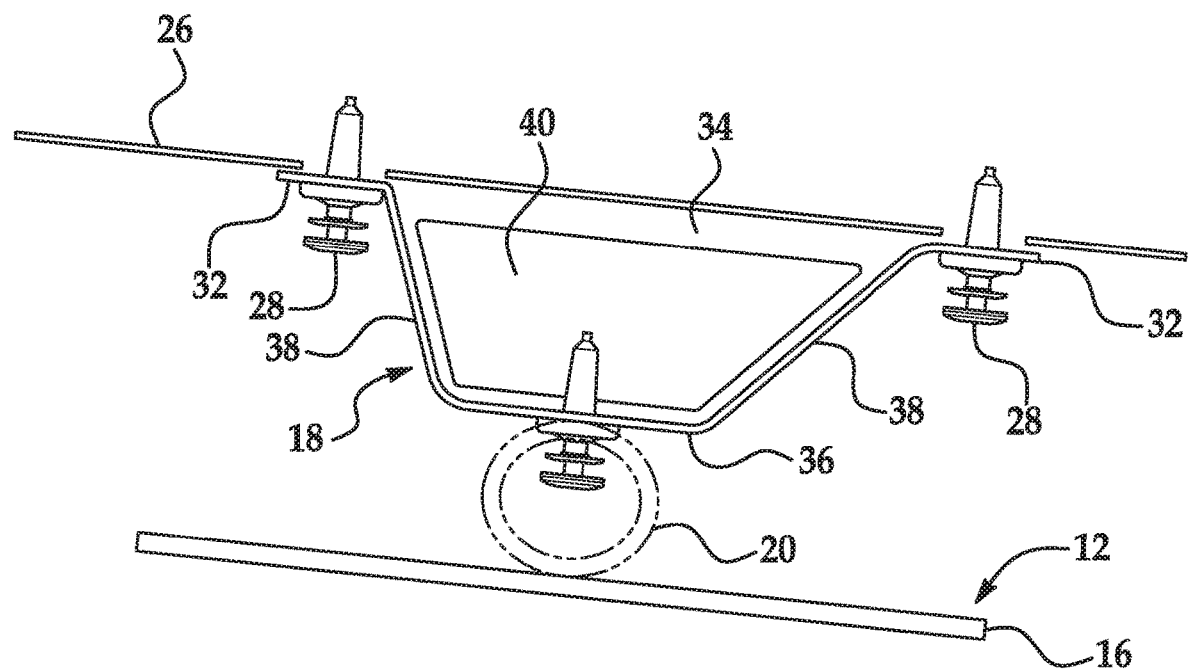
FIG. 6 is another example of a cross-section through line 5.
Figure 7:
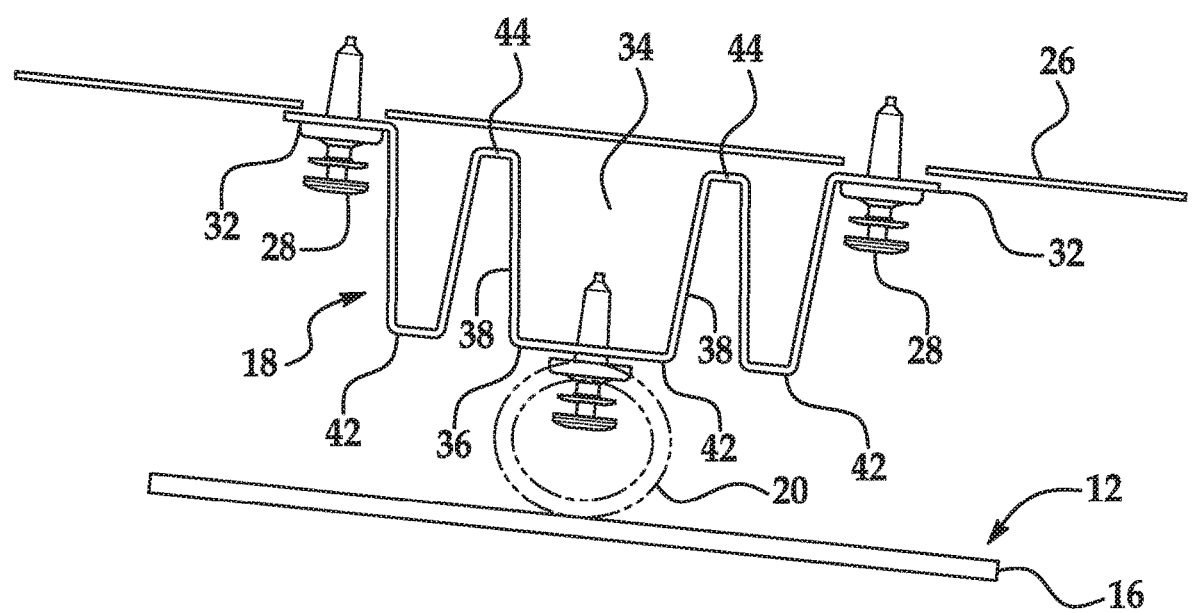
FIG. 7 is another example of a cross-section through line 5.

The ring-shaped energy absorber 18 is compressible relative to the flange 16. In other words, when the hood 14 is in the closed position and impacted at the ring-shaped energy absorber 18, the ring-shaped energy absorber 18 deforms before the flange 16 during a pedestrian impact. The ring-shaped energy absorber 18 may deform more than the flange 16. In some examples, the flange 16 does not deform at all when the ring-shaped energy absorber 18 deforms during a pedestrian impact. As an example, the shape, material type, wall thickness, etc., of the ring-shaped energy absorber 18 and the flange 16 may be designed such that ring-shaped energy absorber 18 is compressible relative to the flange 16. The ring-shaped energy absorber 18 may be compressible relative to the hood inner 26, i.e., deforms before the hood inner 26 during a pedestrian impact. For example, during a pedestrian-to-vehicle impact, the ring-shaped energy absorber 18 may be compressed downward (i.e., toward the storage compartment 12), allowing the hood 14 to deform and reducing impact velocity of the pedestrian. The shape and/or filling of the ring-shaped energy absorber 18 in a radial direction, i.e., in a vertical plane, may provide compressibility of the ring-shaped energy absorber 18. Examples of the shape and filling in the radial direction are shown in FIGS. 5-7 and are described further below.

The ring-shaped energy absorber 18 is ring-shaped, i.e., is continuous with a void in the middle. The ring-shape is the shape of the ring-shaped energy absorber 18 in a generally horizonal plane. The "ring" of the ring-shape may be circular, oval, elliptical, or any polygonal shape.

Figure 4:
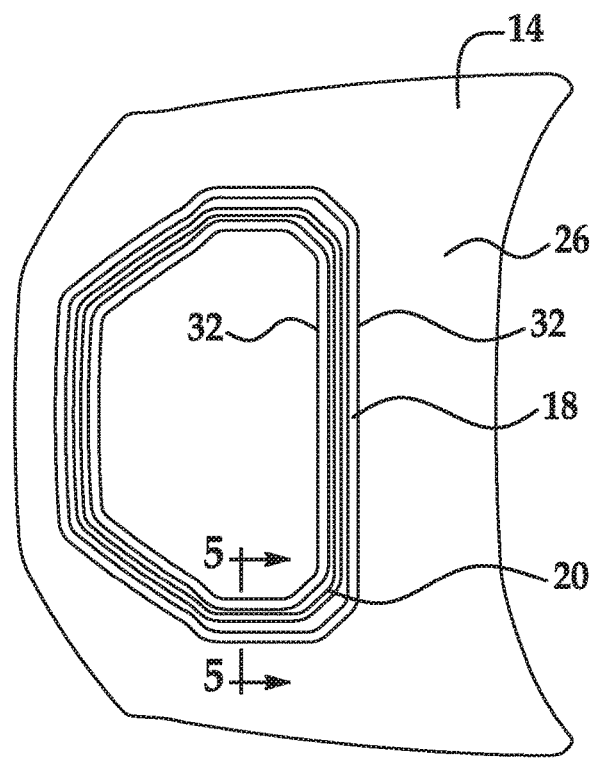
FIG. 4 is a bottom view of the hood, the ring-shaped energy absorber, and the seal.
Figure 5:
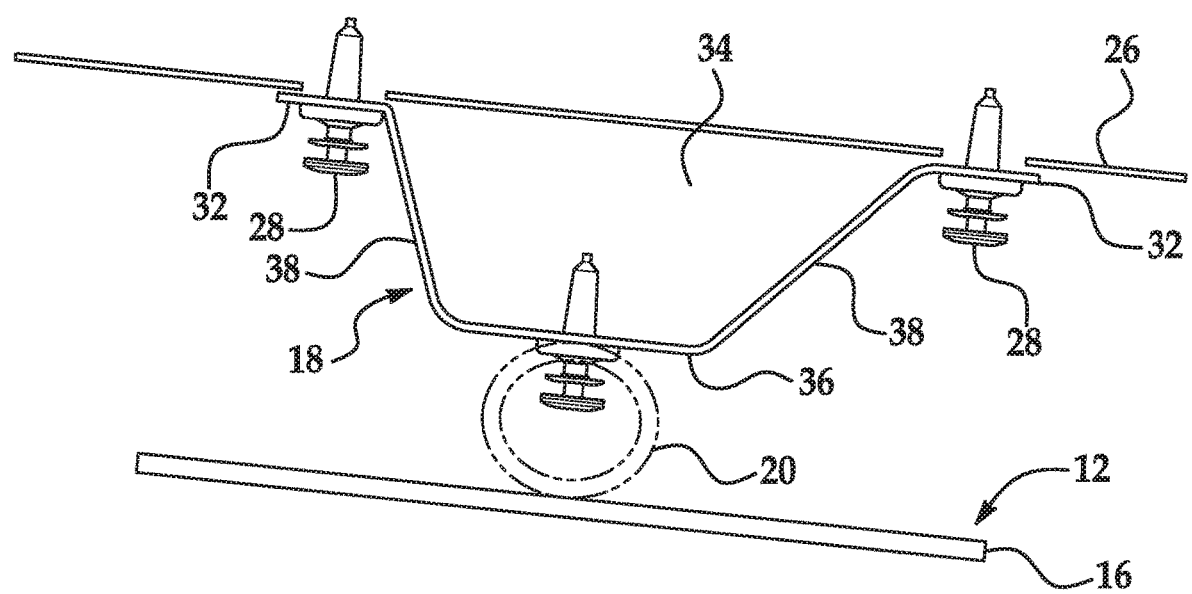
FIG. 5 is one example of a cross-section through line 5 in FIG. 4.

With reference to FIGS. 3-5, in one example, the ring-shaped energy absorber 18 is connected to the hood inner 26. The ring-shaped energy absorber 18 may be connected to the hood inner 26 with fasteners 28, as discussed below. The hood inner 26 is positioned between the hood outer 24 and the ring-shaped energy absorber 18. For example, the hood outer 24 may be positioned above the hood inner 26 and the ring-shaped energy absorber 18 may be positioned below the hood inner 26. The ring-shaped energy absorber 18 may, for example, be plastic, such as polypropyolene, sheet molding composite (SMC), carbon fiber reinforced plastic (CFRP), fiberglass, and/or other fiber reinforced plastic. As another example, the ring-shaped energy absorber 18 may be formed of metal, e.g., aluminum, etc., or any other suitable material.

The flange 16 and the ring-shaped energy absorber 18 both circumferentially enclose the storage compartment 12 in the closed position. In other words, the storage compartment 12 has an open end 30 and the flange 16 and ring-shaped energy absorber 18 extend entirely around the open end 30, i.e., without interruption to seal 20 around the entire periphery of the open end 30. For example, in examples where the seal 20 has a continuous ring-shape, the seal 20 seals the storage compartment 12 around the entire periphery of the open end 30.

The seal 20 is mounted to the ring-shaped energy absorber 18 and positioned between the ring-shaped energy absorber 18 and the flange 16 when the hood 14 is in the closed position. For example, the ring-shaped energy absorber 18 may be positioned above the seal 20 and the flange 16 may be positioned below the seal 20. The seal 20 may be mounted to the ring-shaped energy absorber 18 with fasteners 28, as discussed below. The seal 20 is tubular and elongated around the flange 16. For example, the seal 20 may have a shape that follows the periphery of the flange 16. The seal 20 may be, for example, generally annular shape. The seal 20 may abut the flange 16 when the hood 14 is in the closed position. The seal 20 may keep the storage compartment 12 free from debris, such as rain, snow, road debris, etc., when the hood 14 is in the closed position. In one example, the flange 16 may be a lip, e.g., generally horizontal for engagement by the seal 20. The seal 20 may be elastomeric, e.g., rubber.

With reference to FIG. 5, the ring-shaped energy absorber 18 in a radial cross-section includes two feet 32 spaced from each other and a cavity 34 disposed therebetween. The two feet 32 abut the hood 14. In one example, the two feet 32 abut the hood inner 26. The ring-shaped energy absorber 18 is engaged with the hood 14 (e.g., the hood inner 26), e.g., with fasteners 28. For example, the feet 32 may be engaged with the hood 14. In such an example, the fasteners 28 engage the two feet 32 and the hood 14 (e.g., the hood inner 26). The fasteners 28 may be, for example, threaded fasteners, clips, push-pins, Christmas tree fasteners, etc. In another example, the ring-shaped energy absorber 18 may be connected to the storage compartment 12 with the fasteners 28.

The ring-shaped energy absorber 18 includes a base 36 spaced from the hood 14 (e.g., the hood inner 26) and a leg 38 extending from the base 36 to each foot 32. The cavity 34 is between the base and the hood 14 (e.g., the hood inner 26). The cavity 34 allows the hood 14 to deform during a pedestrian-to-vehicle impact. The ring-shaped energy absorber 18 absorbs energy from and reduces the impact velocity of the pedestrian during the pedestrian-to-vehicle impact. The seal 20 is mounted to the base 36 with the fasteners 28.

With reference to FIG. 6, in another example, an insert 40 may be in the ring-shaped energy absorber 18. The ring-shaped energy absorber 18 may define the cavity 34 and the insert 40 may be in the cavity 34. The insert 40 may be between the ring-shaped energy absorber 18 and one of the hood 14 and the storage compartment 12. In the example shown in the Figures, the insert 40 is between the ring-shaped energy absorber 18 and the hood 14 (e.g., the hood inner 26). In this example, the cavity 34 may face the hood 14 (e.g., the hood inner 26). The insert 40 may be any suitable energy absorbing material. The insert 40 may be foam. Example material types of the insert 40 include polypropylene, polyurethane, polyethylene, etc. The cavity 34 and the insert 40 may be ring-shaped. For example, the cavity 34 and the insert 40 may have a shape that follows the periphery of the flange 16. The insert 40 may absorb energy from the impact velocity of the pedestrian during the pedestrian-to-vehicle impact.

With reference to FIG. 7, in yet another example, the ring-shaped energy absorber 18 in a radial cross-section may have a sinuous shape. The sinuous shape has a series of peaks 42 and troughs 44 that are distal and proximal relative to the hood 14 (e.g., the hood inner 26). For example, the sinuous shape may have a peak 42 spaced from the hood 14 (e.g., the hood inner 26). The peak 42 may be spaced distal from the hood 14 (e.g., the hood inner 26). The peak 42 may be between two other peaks 42 of the sinuous shape. The seal 20 may be mounted to one of the peaks 42, e.g., a middle one of the peaks shown in FIG. 7. The feet 32 may extend from the sinuous shape in opposite directions. The feet 32 may abut the hood 14 (e.g., the hood inner 26). The ring-shaped energy absorber 18 is connected to the hood 14 (e.g., the hood inner 26) with the fasteners 38.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
a storage compartment;
a hood above the storage compartment and movable relative to the storage compartment between an open position and a closed position;
a flange connected to one of the hood and the storage compartment and a ring-shaped energy absorber connected to the other of the hood and the storage compartment, the flange and the ring-shaped energy absorber both circumferentially enclose the storage compartment in the closed position; and
a seal mounted to the ring-shaped energy absorber and positioned between the ring-shaped energy absorber and the flange in the closed position.

2. The vehicle of claim 1, wherein the hood includes a hood outer and a hood inner positioned between the hood outer and the ring-shaped energy absorber.

3. The vehicle of claim 2, wherein the ring-shaped energy absorber is connected to the hood inner.

4. The vehicle of claim 2, wherein the ring-shaped energy absorber is compressible relative to the hood inner.

5. The vehicle of claim 1, wherein the ring-shaped energy absorber is compressible relative to the flange.

6. The vehicle of claim 1, wherein the ring-shaped energy absorber is hollow.

7. The vehicle of claim 1, wherein the ring-shaped energy absorber in a radial cross-section has two feet spaced from each other and a cavity disposed therebetween, the two feet abutting the hood.

8. The vehicle as set forth in claim 7, wherein the ring-shaped energy absorber includes a base spaced from the hood and a leg extending from the base to each foot.

9. The vehicle as set forth in claim 8, wherein the seal is mounted to the base.

10. The vehicle of claim 7, wherein the feet are fixed to the hood.

11. The vehicle of claim 7, further comprising an insert in the cavity.

12. The vehicle of claim 1, further comprising an insert between the ring-shaped energy absorber and the one of the hood and the storage compartment.

13. The vehicle of claim 12, wherein the ring-shaped energy absorber defines a cavity and the foam insert is in the cavity.

14. The vehicle as set forth in claim 13, wherein the cavity faces the hood.

15. The vehicle of claim 1, wherein the ring-shaped energy absorber in a radial cross-section has a sinuous shape.

16. The vehicle of claim 15, wherein the sinuous shape has a peak spaced from the hood, the seal being mounted to the peak.

17. The vehicle of claim 16, wherein the sinuous shape has two other peaks on opposites sides of the seal.

18. The vehicle of claim 15, wherein the ring-shaped energy absorber has feet extending from the sinuous shape in opposite directions, the feet abutting the hood.

19. The vehicle of claim 1, further comprising a fastener connecting the ring-shaped energy absorber to the one of the hood and the storage compartment.

20. The vehicle of claim 1, wherein the seal is tubular and elongated around the flange.

* * * * *